(No Model.)

J. E. PELL.
FERTILIZER ATTACHMENT FOR PLOWS.

No. 434,293. Patented Aug. 12, 1890.

John E. Pell,
Inventor

Witnesses
G. S. Elliott
E. W. Johnson by ——— Attorney

UNITED STATES PATENT OFFICE.

JOHN E. PELL, OF BENJAMIN, NORTH CAROLINA.

FERTILIZER ATTACHMENT FOR PLOWS.

SPECIFICATION forming part of Letters Patent No. 434,293, dated August 12, 1890.

Application filed May 15, 1890. Serial No. 351,969. (No model.)

*To all whom it may concern:*

Be it known that I, JOHN E. PELL, a citizen of the United States of America, residing at Benjamin, in the county of Stokes and State of North Carolina, have invented certain new and useful Improvements in Fertilizer Attachments for Plows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain new and useful improvements in attachments for cultivators or shovel-plows.

The object of the invention is to provide a cheap, simple, and effective device whereby a shovel-plow can be converted into a drill for fertilizers; and it consists in providing the beam of a cultivator or shovel-plow with a hopper having a screw-feed and an actuating-wheel for said screw-feed, said hopper having an opening through which fertilizing material passes and is dropped into a spout which leads to the rear of the plow, the parts being so constructed that they can be readily attached to a plow-beam of ordinary construction; and the invention further consists in the construction and combination of the parts, as will be hereinafter fully set forth, and particularly pointed out in the claims.

Figure 1:
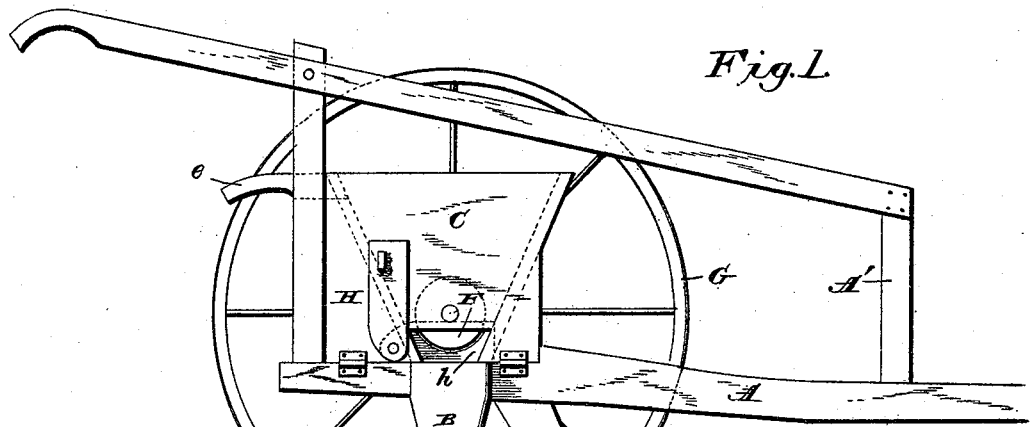
Figure 2:
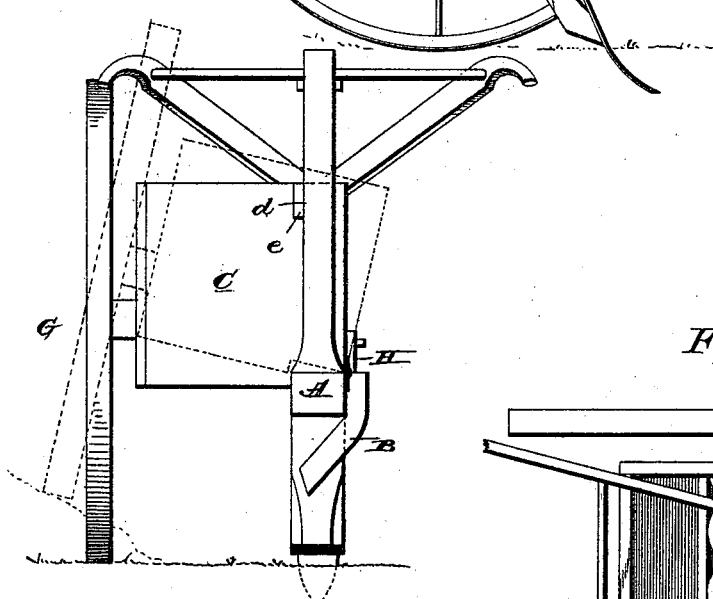
Figure 3:
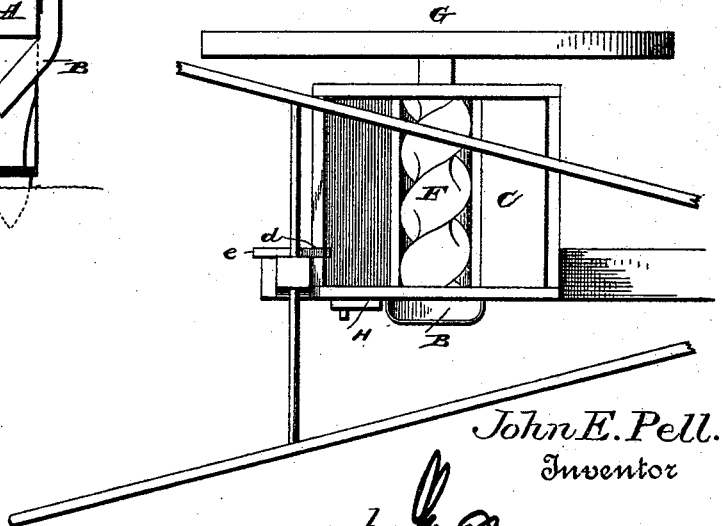

In the accompanying drawings, Figure 1 is a side view of a shovel-plow, showing my improved fertilizer-distributer attached thereto. Fig. 2 is a rear elevation, and Fig. 3 a plan view.

A refers to the plow-beam carrying the standard A' and handles, which may be connected thereto in the ordinary manner.

To one side of the plow-beam, preferably the rear of the standard, is removably attached a spout B, a portion of which is curved under the plow-beam, so that the delivery-opening at the bottom thereof will be in rear of the plow-shovel.

C refers to the hopper, which can be hinged or otherwise secured to the side of the plow-beam, so that a portion thereof will rest upon the upper edge of the plow-beam, and, if desired, the said plow-beam can be cut away to form a better support for one of the sides of the hopper. The under side of the hopper is preferably cut away where it rests upon the beam, and may be notched at its rear upper edge, as shown at $d$, and with said notches a pivoted latch $e$ can engage to hold the hopper securely in place. The bottom of the hopper is concave, and above the same is journaled a screw-feeder F, one end of which projects through the hopper, so as to form an axle, upon which is rigidly secured a supporting and actuating wheel G. On the opposite side of the hopper from the wheel is an opening $h$, through which the fertilizing material will be fed to the spout B, and said opening can be covered by a pivoted door H, which can be thrown down when it is desired to cut off the feed, or thrown back upon its pivot when it is desired that the fertilizing material shall pass from the hopper to the feed-spout. The bottom of the hopper is normally slightly inclined with respect to the beam, and when the latch $e$ is out of engagement with the hopper the wheel will adjust itself automatically to the ground and inequalities thereof. The wheel G is of such diameter that its lower portion will act in contact with the surface of the ground, and as the plow is moved forward it will turn the feed-screw F.

The device hereinbefore described is extremely simple, and is readily applicable to cultivators usually manufactured, and should a double-shovel plow be used it is obvious that a hopper having two compartments or two feed-wheels with separate openings might be employed.

I claim—

1. In combination with a shovel-plow, a feed-spout secured to one side of the beam and having its discharge-opening terminating in the rear of the plow-standard, a hopper removably supported at one side upon said beam and provided with a screw-feed and actuating-wheel, the latter supporting the other side of the hopper, substantially as shown, and for the purpose set forth.

2. In combination with a plow-beam, a delivery-spout B, having the upper portion projecting beyond the side thereof and the lower portion curved to extend under the beam and terminating in the rear of the plow-standard, a hopper hinged to the side of the beam to be freely adjustable thereon, said hopper having a discharge-opening over the spout, and a feed-shaft and support and actuating-wheel mounted on said feed-shaft, substantially as set forth.

3. In combination with the beam A, carrying a discharge-spout B, terminating in the rear of the plow-standard, a hopper pivotally secured to the beam and provided with a discharge-opening above the spout, a cut-off adapted to close said discharge-opening, a screw-feed F, journaled in the hopper and provided with an actuating and supporting wheel G, a pivoted catch e, and a notch in the hopper with which said catch engages, substantially as shown, and for the purpose set forth.

In testimony whereof I affix my signature in presence of two witnesses.

JOHN E. PELL.

Witnesses:
C. C. INMAN,
W. R. NEEDHAM.